(12) United States Patent
Casazza et al.

(10) Patent No.: US 9,505,188 B2
(45) Date of Patent: Nov. 29, 2016

(54) WIND TURBINE BLADE TUBULAR SPAR FABRICATING METHOD

(75) Inventors: Matteo Casazza, Val di Vizze (IT); Matteo Verdesca, Tresivio (IT); (Continued)

(73) Assignee: WINDFIN B.V., Leimuiden (NL)

( * ) Notice: Subject to any disclaimer, the term of this patent is extended or adjusted under 35 U.S.C. 154(b) by 719 days.

(21) Appl. No.: 13/876,705

(22) PCT Filed: Sep. 30, 2011

(86) PCT No.: PCT/IB2011/054314
§ 371 (c)(1),
(2), (4) Date: Aug. 6, 2013

(87) PCT Pub. No.: WO2012/042506
PCT Pub. Date: Apr. 5, 2012

(65) Prior Publication Data
US 2013/0334735 A1 Dec. 19, 2013

(30) Foreign Application Priority Data
Sep. 30, 2010 (IT) .............................. MI2010A1796

(51) Int. Cl.
*B29C 70/44* (2006.01)
*B29D 99/00* (2010.01)
*F03D 1/06* (2006.01)
*B29L 31/08* (2006.01)

(52) U.S. Cl.
CPC ......... *B29D 99/0025* (2013.01); *B29C 70/443* (2013.01); *F03D 1/0675* (2013.01); (Continued)

(58) Field of Classification Search
CPC .................. B29C 70/443; B29C 70/30; B29C 70/682; B29C 70/683; B29C 70/685
See application file for complete search history.

(56) References Cited

U.S. PATENT DOCUMENTS 5,087,187 A * 2/1992 Simkulak ................ B29C 43/32
264/258
5,547,629 A * 8/1996 Diesen .................. B29C 33/505
264/257

(Continued)

FOREIGN PATENT DOCUMENTS

DE 10 2008 022548 11/2009
WO WO 2009/139619 11/2009

(Continued)

OTHER PUBLICATIONS

Weaver, P.M., J.R. Driesen, P. Roberts, The effect of flexural/twist anisotropy on compression buckling of quasi-isotropic laminated cylindrical shells, Composite Structures, vol. 55 (2002), pp. 195-204.*

(Continued)

*Primary Examiner* — Matthew Daniels
(74) *Attorney, Agent, or Firm* — Neal, Gerber & Eisenberg LLP

(57) ABSTRACT

A method of fabricating a wind turbine blade tubular spar, wherein the tubular spar extends along a designated axis, is made of reinforced polymer material having fibers arranged in at least two directions, and a polymer matrix incorporating the fibers, and has two caps and two webs; the method including the steps of: molding and cross-linking at least part of a cap or web in composite material; molding and cross-linking an L-shaped structure, which has two opposite parallel flanges, and at least partly incorporates the previously molded, cross-linked cap or web of composite material; repeating the above steps to mold and cross-link a further L-shaped structure; and joining the two cross-linked, L-shaped structures, with the flanges positioned facing in pairs.

27 Claims, 6 Drawing Sheets

(75) Inventors: Amedeo Sabbadin, Padua (IT); Philip Baby, Kerala State (IN)

(52) U.S. Cl.
CPC .. *B29L 2031/085* (2013.01); *F05B 2280/6003* (2013.01); *Y02E 10/721* (2013.01); *Y02P 70/523* (2015.11)

(56) References Cited

U.S. PATENT DOCUMENTS

| | | | | |
|---|---|---|---|---|
| 5,755,558 | A | * | 5/1998 | Reinfelder ............ B29C 70/446 29/889.7 |
| 6,264,877 | B1 | * | 7/2001 | Pallu De La Barriere ................ B29C 70/446 264/258 |
| 7,179,059 | B2 | * | 2/2007 | Sorensen .............. F03D 1/0675 416/226 |
| 2010/0014979 | A1 | * | 1/2010 | Jensen .................... F03D 1/065 416/223 R |
| 2012/0219425 | A1 | * | 8/2012 | Sanz Pascual ........ F03D 1/0675 416/226 |

FOREIGN PATENT DOCUMENTS

| | | |
|---|---|---|
| WO | WO 2009/153342 | 12/2009 |
| WO | WO 2010/037762 | 4/2010 |

OTHER PUBLICATIONS

International Search Report and Written Opinion for International Application No. PCT/IB2011/054314 dated Jul. 16, 2012.
Notification Concerning Submission, Obtention or Transmittal of Priority Document (Form PCT/IB/304) dated Jan. 19, 2012.
PCT Demand (Form PCT/IPEA/401) dated Oct. 16, 2012.
Notification of Receipt of Demand by Competent International Preliminary Examining Authority (Form PCT/IPEA/402) dated Oct. 23, 2012.
Notification of Transmittal of the International Preliminary Report on Patentability (Form PCT/IPEA/416) dated Feb. 28, 2013.
International Preliminary Report on Patentability (Form PCT/IPEA/409) dated Feb. 28, 2013.

\* cited by examiner

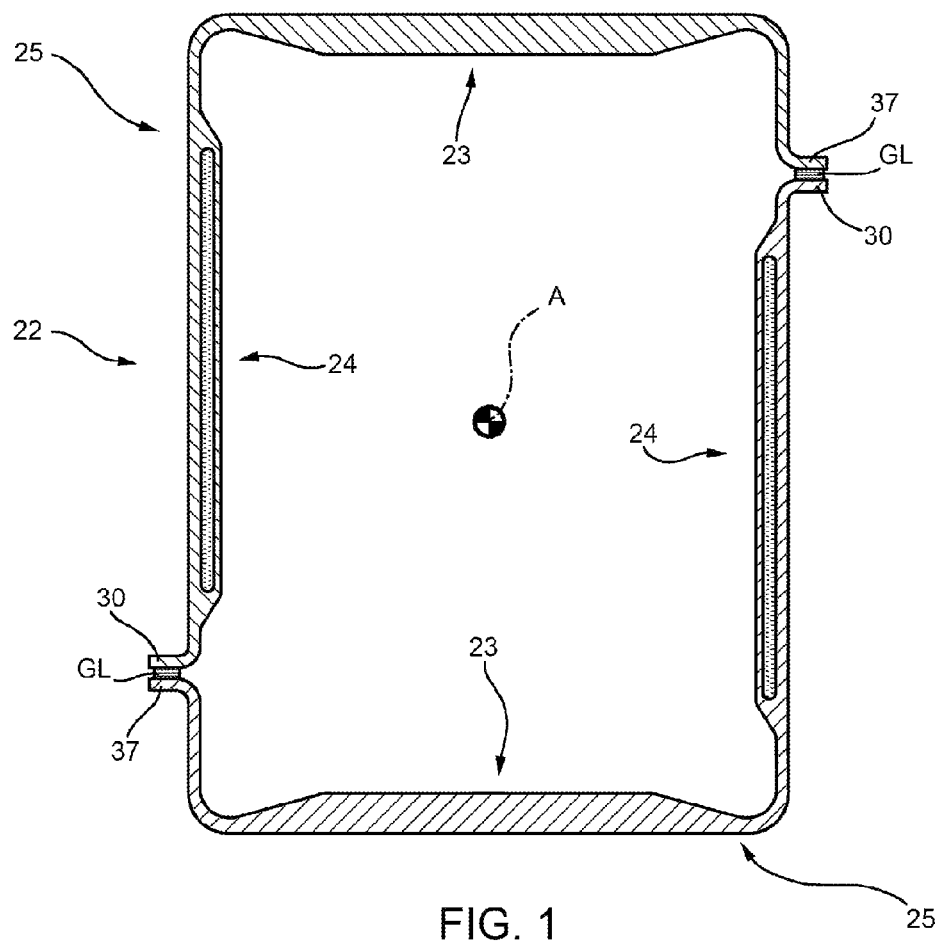
FIG. 1
FIG. 2
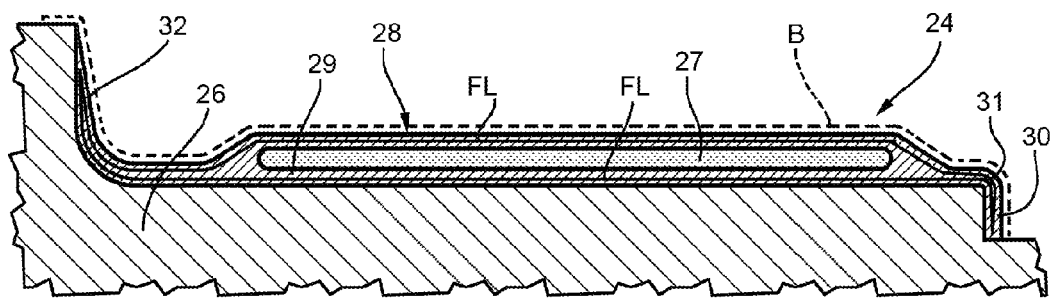

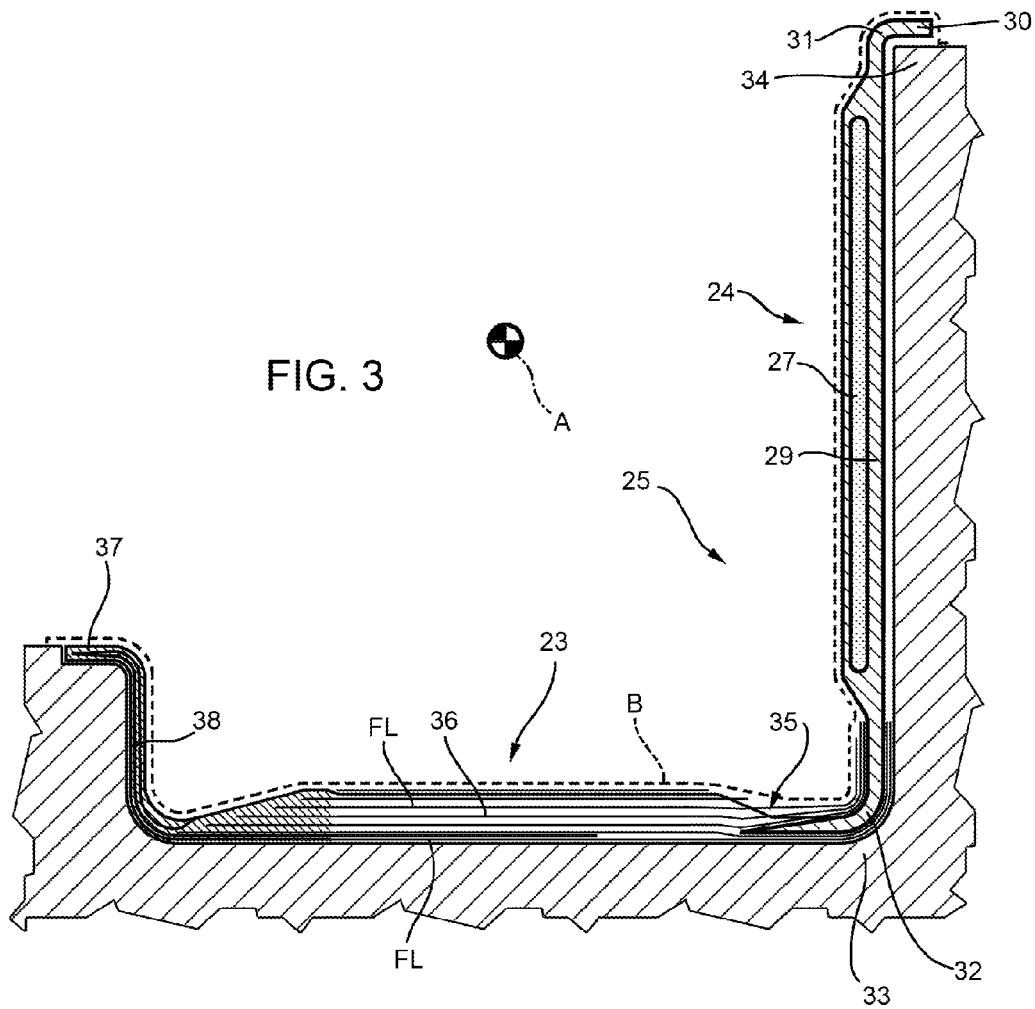
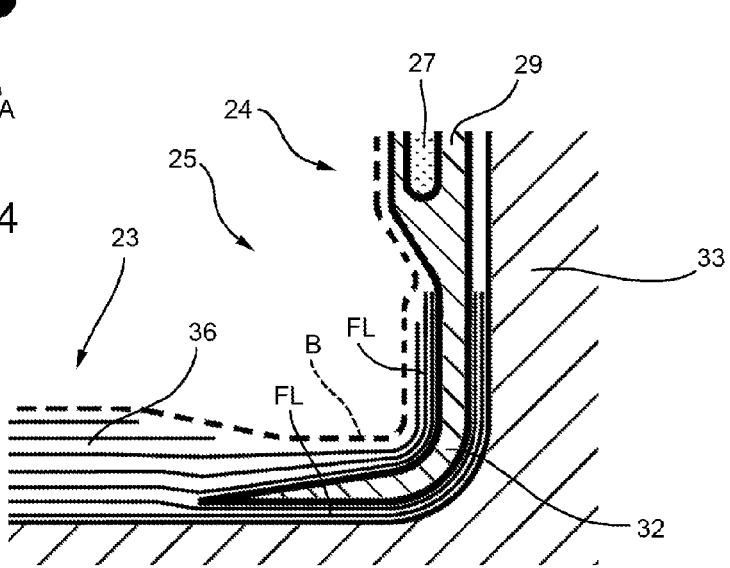

WIND TURBINE BLADE TUBULAR SPAR FABRICATING METHOD

PRIORITY CLAIM

This application is a national stage application of PCT/IB2011/054314, filed on Sep. 30, 2011, which claims the benefit of and priority to Italian Patent Application No. MI2010A001796, filed on Sep. 30, 2010, the entire contents of which are each incorporated by reference herein.

BACKGROUND

Certain known wind turbine blades comprise a root connecting the blade to the hub; a supporting frame connected to the root; and a shell defining the blade section and fitted to the frame.

Wind turbine blades can span considerable lengths, and are subjected to severe stress by the wind, which is transmitted from the shell to the frame, and which the frame is specially designed to withstand.

As shown in U.S. Published Patent Application No. 2009/0136355 A1 and U.S. Published Patent Application No. 2010/0068065 A1, the supporting frame substantially comprises a tubular, substantially rectangular-section spar comprising two opposite parallel caps connected to the shell, and two opposite parallel webs, and which may vary in cross section from the root to the free end of the blade. The caps are positioned directly contacting the shell, may sometimes even form part of the shell and the blade section, and are subjected to bending stress; whereas the webs are subjected mainly to shear stress.

The tubular spar and the shell are made of extremely strong, lightweight plastic reinforced with glass fibers (GFRP), carbon fibers (CFRP), or fibers of other suitable material. And known fabricating methods, as described for example in PCT Patent Application No. WO 2009/153341, PCT Patent Application No. WO 2009/153342 and PCT Patent Application No. WO 2009/153343, comprise molding and cross-linking the two caps and webs; and mainly gluing the caps to the webs to form a tubular spar.

An alternative method is to mold and cross-link two U-shaped members, and glue them together, as described in U.S. Published Patent Application No. 2005/0214122. This solution has the drawback of producing webs with a break along the centreline, and of not allowing use, along the webs, of fibers parallel to the tubular spar axis, thus reducing the structural strength of the webs.

Another tubular spar fabricating method, described in PCT Patent Application No. WO 2010/037762, comprises molding two non-cross-linked L-shaped members, in which three preformed members, some made of non-cross-linked polymers, are embedded in a fiber-reinforced polymer matrix; and gluing the two non-cross-linked L-shaped members together to form a tubular spar. This method involves using two adjacent molds, and simultaneously cross-linking the non-cross-linked preformed members embedded in the L-shaped members, the L-shaped structures themselves, and the glue between the L-shaped structures.

Cross-linking in two adjacent molds forming a closed chamber is a complicated job, and, because of the heat liberated, simultaneously cross-linking the polymer matrix and glue calls for complex, high-cost molds, and increases the risk of rejects. The cost of the method is further increased by the preformed non-cross-linked reinforced-plastic members, which are expensive and involve complex handling procedures.

SUMMARY

The present disclosure relates to a wind turbine blade tubular spar fabricating method.

It is one advantage of the present disclosure to provide a wind turbine blade tubular spar fabricating method configured to eliminate certain of the drawbacks of certain of the known art.

Another advantage of the present disclosure is to provide a wind turbine blade tubular spar fabricating method configured to produce a tubular spar of highly precise dimensions.

Another advantage of the present disclosure is to provide a wind turbine blade tubular spar that is relatively easy to produce.

According to the present disclosure, there is provided a wind turbine blade tubular spar fabricating method, wherein the tubular spar extends along a designated or given axis, is made of reinforced polymer material comprising fibers arranged in at least two directions, and a polymer matrix incorporating the fibers, and comprises two caps and two webs; the method comprising the steps of:
- molding and cross-linking at least part of a cap or web in composite material;
- molding and cross-linking an L-shaped structure, which comprises two opposite flanges parallel to each other and to the cap, and at least partly incorporates the previously molded, cross-linked cap or web of composite material;
- repeating the above steps to mold and cross-link a further L-shaped structure; and
- joining the two cross-linked, L-shaped structures, with the flanges positioned facing in pairs.

The present disclosure provides for producing molded cross-linked parts with good dimensional tolerances, while at the same time reducing the amount of polymer material for cross-linking in the L-shaped structure, and so cross-linking the L-shaped structure faster. In addition, the dimensional accuracy of the flanges, and the fact that they are parallel to one another and to the cap, make the L-shaped structures relatively easier to connect.

Tests conducted by the Applicant confirm the method according to the present disclosure also minimizes rejects.

In one embodiment of the present disclosure, the method comprises molding and cross-linking in a first mold a cap comprising a main body, and an anchor comprising a portion perpendicular to the main body; and incorporating the anchor in the web when molding and cross-linking the L-shaped structure in a second mold.

The cap and web are thus connected structurally to each other, but formed in two separate steps for greater dimensional precision.

In another embodiment of the present disclosure, the method comprises placing the cap anchor between at least two layers of web fibers, before incorporating the cap anchor in the web polymer matrix.

This provides for greatly improving the stress resistance of the structural bond between the cap and web.

In another embodiment of the present disclosure, the method comprises molding and cross-linking in a first mold a web comprising a main body, and an anchor comprising a portion perpendicular to the main body; and incorporating the anchor in the cap when molding and cross-linking the L-shaped structure in a second mold.

The method of one embodiment comprises placing the web anchor between at least two layers of cap fibers.

In this case, it is the web which is incorporated partly in the cap.

In another embodiment of, the method according to the present disclosure, the step of molding and cross-linking the L-shaped structure comprises placing successively inside the second mold: at least one fiber layer; a preformed cross-linked cap portion on top of the fiber layer; a core positioned substantially perpendicular to the preformed cross-linked cap portion and on top of the fiber layer; and a further fiber layer on top of the preformed cross-linked cap portion and the core; and incorporating the fiber layers, the preformed cross-linked cap portion, and the core in a polymer matrix.

In this way, cross-linking only involves a thin surface portion of the L-shaped structure.

In one embodiment, the fiber layer and further fiber layer are laid directly one on top of the other at the flanges.

Additional features and advantages are described in, and will be apparent from the following Detailed Description and the figures.

BRIEF DESCRIPTION OF THE DRAWINGS

A number of non-limiting embodiments of the present disclosure will be described by way of example with reference to the accompanying drawings, in which:

FIG. 1 shows a cross section, with parts removed for clarity, of a tubular spar produced in accordance with a second embodiment of the present disclosure;

FIG. 2 shows a larger-scale section, with parts removed for clarity, of a step in the fabrication of a web of the FIG. 1 tubular spar;

FIG. 3 shows a larger-scale section, with parts removed for clarity, of a step in the fabrication of a structure of the FIG. 1 tubular spar;

FIG. 4 shows a larger-scale section, with parts removed for clarity, of a detail of FIG. 3;

DETAILED DESCRIPTION

Figure 5:
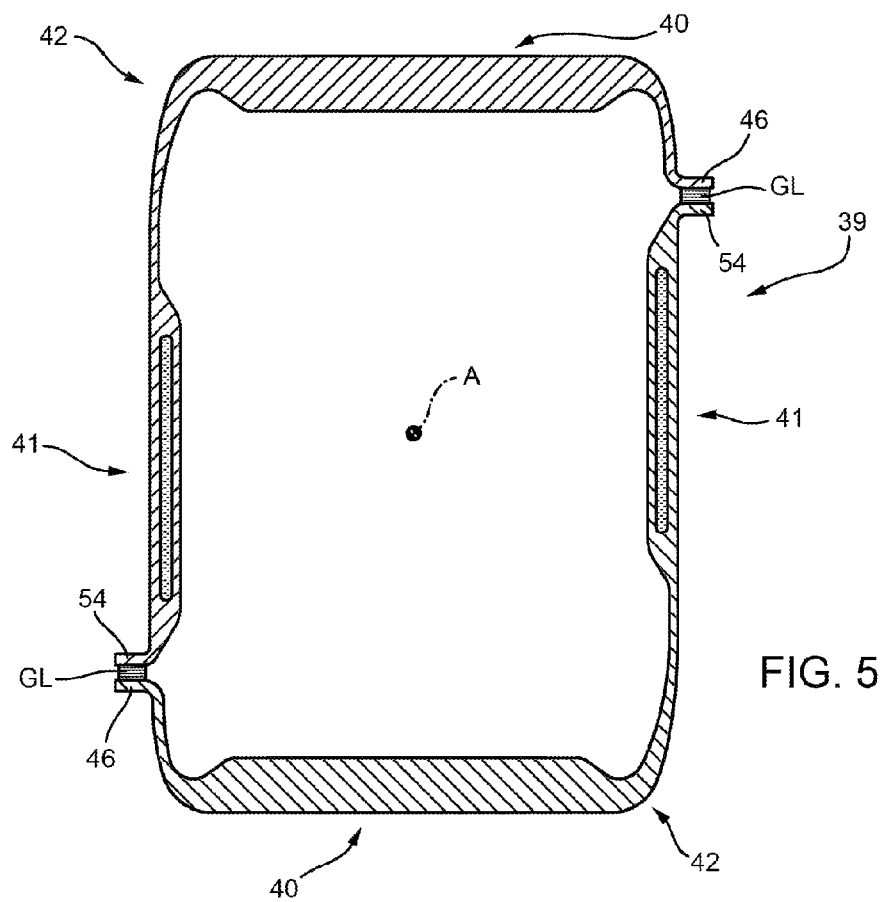
FIG. 5 shows a cross section, with parts removed for clarity, of a tubular spar produced in accordance with a third embodiment of the present disclosure.

Referring now to the example embodiments of the present disclosure illustrated in FIGS. 1 to 12, number 22 in FIG. 1 indicates as a whole a tubular spar configured to support a hollow blade (not shown) of a wind turbine (not shown). In the example shown, tubular spar 22 extends along an axis A, and comprises two opposite caps 23 configured to withstand bending stress, and two opposite webs 24 configured to withstand shear stress. Caps 23 and webs 24 are made of polymer material reinforced with carbon or glass or other suitable fibers, which are normally preassembled in layers with a designated or given orientation. The number or quantity of fiber layers and orientation of the fibers depend on the application, and on the type and degree of stress to which caps 23 and webs 24 are subjected in use. Each cap 23 is joined to a respective web 24 to form an L-shaped structure 25, which is, connected to another L-shaped structure 25 by layers of glue GL to form tubular spar 22.

The method of producing each L-shaped structure 25 comprises the steps of forming and cross-linking web 24; and then molding cap 23, and simultaneously anchoring web 24 in the liquid polymer matrix of cap 23, before cross-linking the polymer matrix of cap 23.

More specifically, as shown in FIG. 2, web 24 is formed in a mold 26 by:
  laying at least one fiber layer FL on the bottom of mold 26;
  placing a core 27 inside mold 26, on top of fiber layer FL;
  laying at least one further fiber layer FL in mold 26, at least partly over core 27;
  closing mold 26 to form a closed chamber 28 about fiber layers FL and core 27;
  forming a vacuum in closed chamber 28;
  feeding the liquid polymer matrix into the closed vacuum chamber 28 to incorporate the fiber layers FL and core 27 in the polymer matrix; and
  cross-linking the polymer matrix in mold 26 by heating mold 26; wherein one embodiment includes heat-setting polymers for this type of application.

Web 24 comprises a main body 29; a flange 30 substantially perpendicular to main body 29; a curved connecting portion 31 of flange 30; and a curved anchor 32 located on the opposite side to flange 30 and having an end portion substantially perpendicular to main body 29.

As shown in FIG. 3, cap 23 and L-shaped structure 25 are formed by:
  laying at least one fiber layer FL in a mold 33;
  positioning web 24 inside mold 33, with the shoulder formed by flange 30 and connecting portion 31 in a designated or given position with respect to a reference point 34 on mold 33, and with anchor 32 resting on fiber layer FL;
  laying at least one further fiber layer FL in mold 33, partly on top of anchor 32;
  closing mold 33 to form a closed chamber 35 about fiber layers FL and web 24;
  forming a vacuum in closed chamber 35;
  feeding the liquid polymer matrix into the closed vacuum chamber 35 to incorporate the fiber layers FL and anchor 32 in the polymer matrix, as shown more clearly in FIG. 4; and
  cross-linking the polymer matrix in mold 33 by heating mold 33; wherein one embodiment includes heat-setting polymers for this type of application.

As shown in FIG. 3, the cap 23 so formed is connected rigidly to web 24, and comprises a main body 36; a lateral flange 37 on the opposite side to web 24 and substantially parallel to main body 36; and a partly curved connecting portion 38 between main body 36 and flange 37.

Each L-shaped structure 25 comprises two parallel, outwardly-projecting flanges 30, 37, and is formed when molding cap 23, with no need to glue cap 23 to web 24; and two L-shaped structures 25, formed as described above, are connected by two layers of glue GL to form tubular spar 22 in FIG. 1.

Number 39 in FIG. 5 indicates a tubular spar comprising two opposite, parallel caps 40 configured to withstand bending stress, and two opposite, parallel webs 41 configured to withstand shear stress. Each cap 40 is C-shaped and connected to a respective web 41 to form an L-shaped structure 42, which is connected to another L-shaped structure 42 by layers of glue 21 to form tubular spar 39.

The method of producing the tubular spar 39 comprises the steps of forming and cross-linking cap 40; and then molding web 41, and simultaneously incorporating cap 40 in the liquid polymer matrix of web 41, before cross-linking the polymer matrix of web 41.

Figure 6:
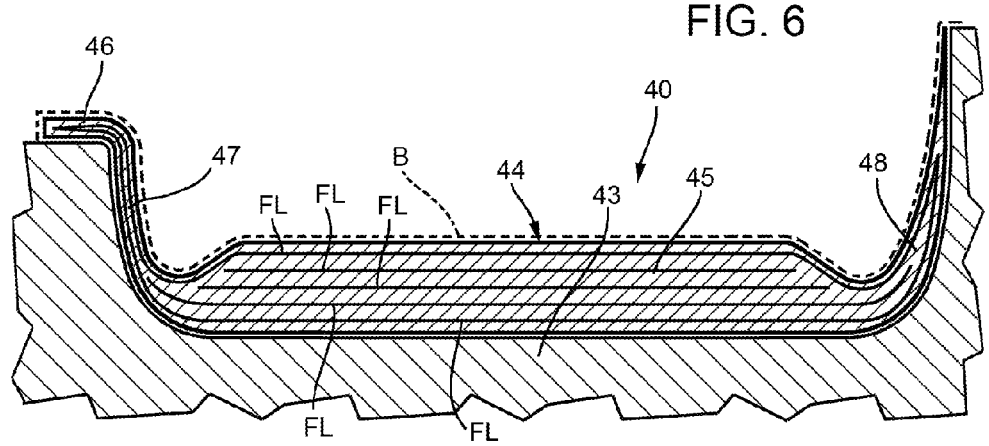
FIG. 6 shows a larger-scale section, with parts removed for clarity, of a step in the fabrication of a cap of the FIG. 5 tubular spar.

More specifically, as shown in FIG. 6, cap 40 is formed in a mold 43 by:
 laying at least one fiber layer FL on the bottom of mold 43;
 closing mold 43 to form a closed chamber 44 about fiber layer FL;
 forming a vacuum in closed chamber 44;
 feeding the liquid polymer matrix into the closed vacuum chamber 44 to incorporate the fiber layer FL in the polymer matrix; and
 cross-linking the polymer matrix in mold 43 by heating mold 43; wherein one embodiment includes heat-setting polymers for this type of application.

Cap 40 comprises a main body 45; a lateral flange 46 substantially parallel to main body 45; a connecting portion 47 between main body 45 and lateral flange 46; and an anchor 48 located on the opposite side to lateral flange 46 and having an end portion substantially perpendicular to main body 45.

Figure 7:
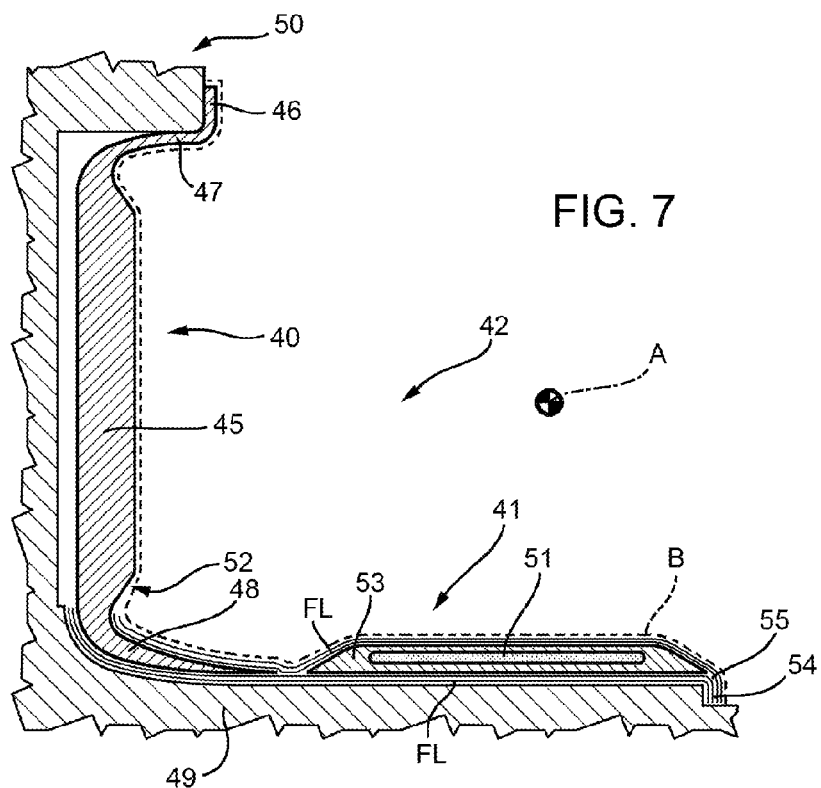
FIG. 7 shows a larger-scale section, with parts removed for clarity, of a structure of the FIG. 5 tubular spar.
Figure 8:
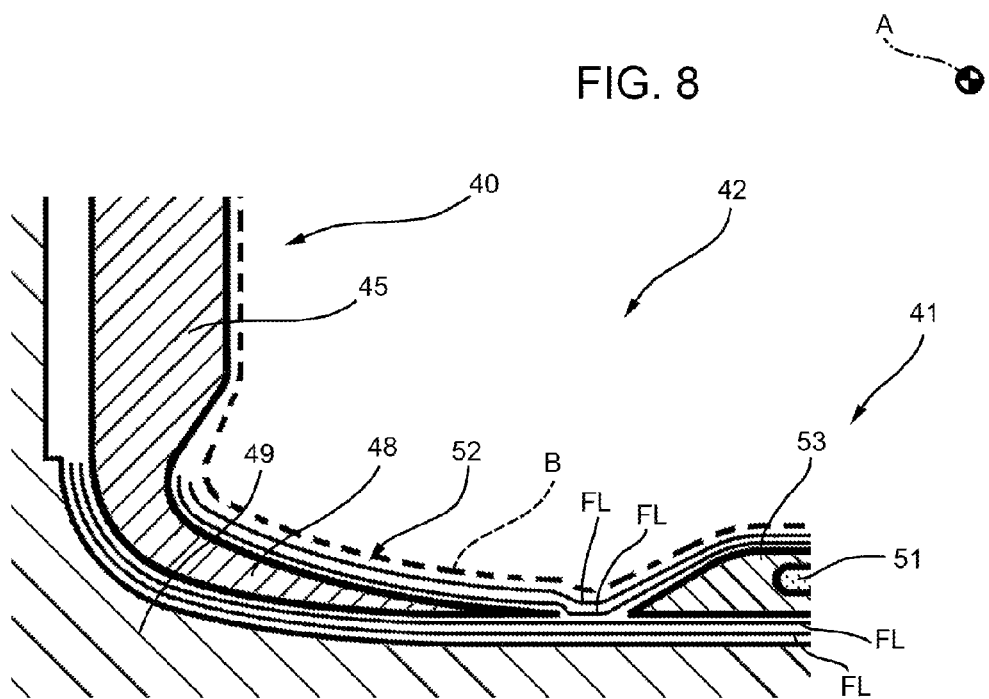
FIG. 8 shows a larger-scale section, with parts removed for clarity, of a detail of FIG. 7.

As shown in FIG. 7, web 41 and structure 42 are formed by:
 laying at least one fiber layer FL inside a mold 49;
 positioning cap 40 inside mold 49, with the shoulder formed by lateral flange 46 and connecting portion 47 in a designated or given position with respect to a reference point 50 on mold 49, and with anchor 48 resting on fiber layer FL;
 placing a core 51 on fiber layer FL;
 laying at least one further fiber layer FL in mold 49, partly on top of anchor 48 and partly on top of core 51;
 closing mold 49 to form a closed chamber 52 about fiber layers FL, core 5, and anchor 48;
 forming a vacuum in closed chamber 52;
 feeding the liquid polymer matrix into the closed vacuum chamber 52 to incorporate the fiber layers FL, core 41, and anchor 48 in the polymer matrix, as shown more clearly in FIG. 8; and
 cross-linking the polymer matrix in mold 49 by heating mold 49; wherein one embodiment includes heat-setting polymers for this type of application.

Web 41 so formed is connected to cap 40, and comprises a main body 53; a lateral flange 54 located on the opposite side to cap 40 and substantially perpendicular to main body 53; and a connecting portion 55 between main body 36 and flange 37.

In this embodiment, L-shaped structure 42 is formed when pouring web 41, with no need to glue cap 40 to web 41; and two L-shaped structures 42, formed and cross-linked as described above, are connected by two layers of glue GL to form tubular spar 39 in FIG. 5.

Figure 9:
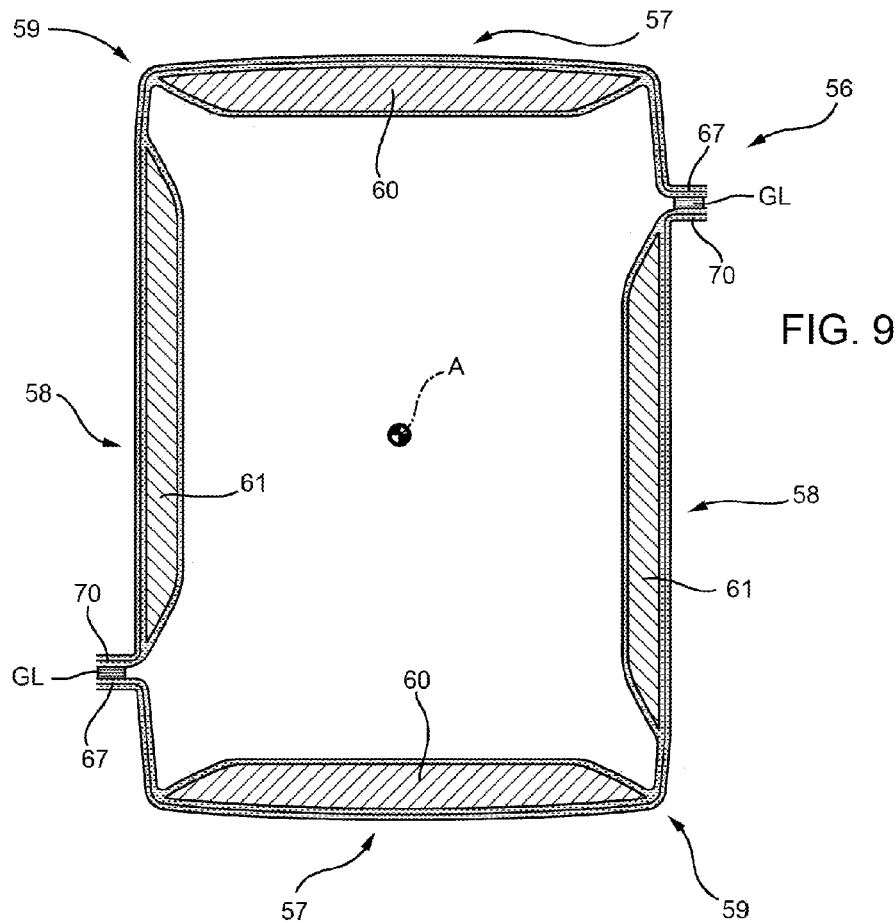
FIG. 9 shows a cross section, with parts removed for clarity, of a tubular spar produced in accordance with a fourth embodiment of the present disclosure.

Number 56 in FIG. 9 indicates a tubular spar comprising two opposite, parallel caps 57 configured to withstand bending stress, and two opposite, parallel webs 58 configured to withstand shear stress. Each cap 57 is connected to a respective web 58 to form an L-shaped structure 59, which is connected to another L-shaped structure 59 by layers of glue GL to form tubular spar 56.

Cap 57 comprises a part—in the example shown, a core 60—made of cross-linked, fiber-reinforced polymer material, and web 58 comprises a core 61 made of polymer foam or balsa or other relatively lightweight material.

The method of producing each L-shaped structure 59 comprises the steps of partly forming cap 57; and then molding web 58 and simultaneously incorporating the preformed part of cap 57 in the liquid polymer matrix of web 58, before cross-linking the polymer matrix of web 58.

Figure 10:
FIG. 10 shows a larger-scale section, with parts removed for clarity, of a step in the fabrication of a cap of the FIG. 9 tubular spar.

More specifically, as shown in FIG. 10, the preformed cross-linked part of cap 57 (i.e., core 60) is formed in a mold 62 by:
 laying at least one fiber layer FL on the bottom of mold 62;
 closing mold 62 to form a closed chamber 63 about fiber layer FL;
 forming a vacuum in closed chamber 63;
 feeding the liquid polymer matrix into the closed vacuum chamber 63 to incorporate fiber layer FL in the polymer matrix; and
 cross-linking the polymer matrix in mold 62 by heating mold 62; wherein one embodiment includes heat-setting polymers for this type of application.

Figure 12:
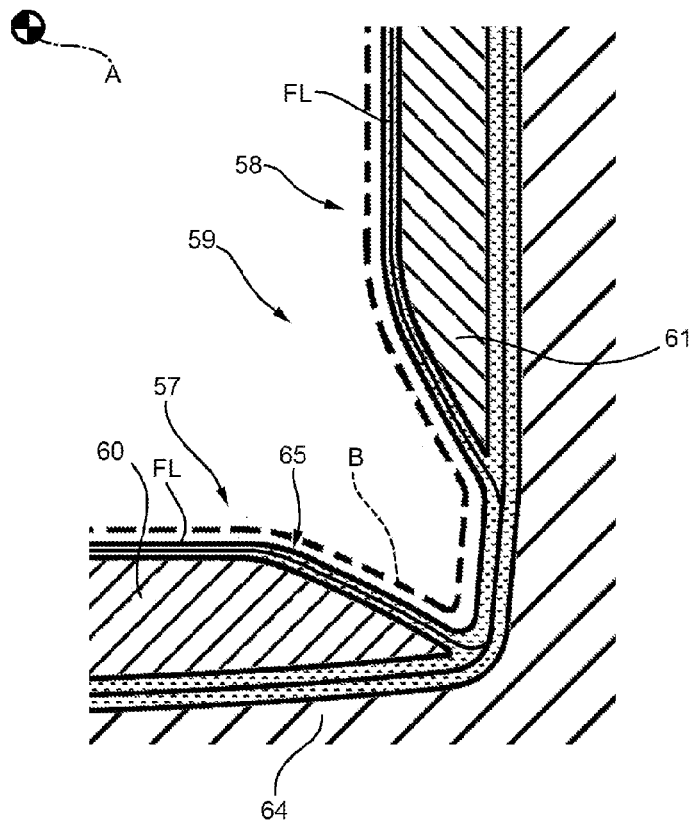
FIG. 12 shows a larger-scale section, with parts removed for clarity, of a detail of FIG. 11.
Figure 11:
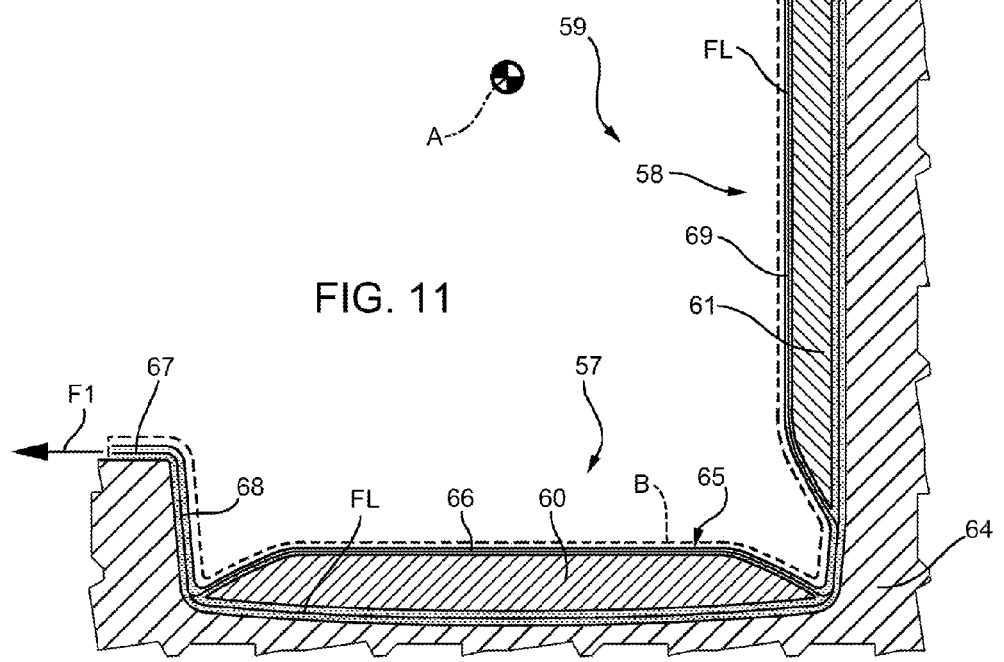
FIG. 11 shows a larger-scale section, with parts removed for clarity, of a structure of the FIG. 9 tubular spar.

As shown in FIG. 11, web 58 and structure 59 are formed simultaneously by:
 laying at least one fiber layer FL on the horizontal and vertical walls of a mold 64;
 placing core 60 on top of fiber layer FL in mold 64;
 placing core 61 on top of fiber layer FL in mold 64, in a position substantially perpendicular to core 60;
 laying at least one further fiber layer FL in mold 64, partly on top of cores 60 and 61;
 closing mold 64 to form a closed chamber 65 about fiber layers FL and cores 60 and 61;
 forming a vacuum in closed chamber 65;
 feeding the liquid polymer matrix into the closed vacuum chamber 65 to incorporate fiber layers FL and cores 60 and 61 in the polymer matrix, as shown more clearly in FIG. 12; and
 cross-linking the polymer matrix in mold 64 by heating mold 64; wherein one embodiment includes heat-setting polymers for this type of application.

Arrow F1 indicates where and the direction in which air is extracted to form the vacuum in closed chamber 65; and arrow F2 indicates where and the direction in which the liquid polymer matrix is fed in.

As shown in FIG. 10, cap 57, core 58, and L-shaped structure 59 are completed simultaneously inside mold 64.

More specifically, cap 57 comprises a main body 66; a lateral flange 67 located on the opposite side to web 58 and substantially parallel to main body 66; and a connecting portion 68 between main body 66 and flange 67.

Web 58 comprises a main body 69; a lateral flange 70 substantially perpendicular to main body 69; and a connecting portion 71 between main body 69 and lateral flange 70. And L-shaped structure 59 comprises a connecting portion 72 configured to connect cap 57 and web 58, and which is formed integrally with web 58 and part of cap 57.

The present disclosure has major advantages. In particular, it provides for producing tubular spars of extremely accurate dimensions.

The thickness of the layer of glue enables adjustment to the height of the tubular spar (i.e., the distance between the two opposite caps).

And the connections and joints are made in low-stress areas of the tubular spar.

Clearly, changes may be made to the method as described herein without, however, departing from the scope of the accompanying Claims. It should thus be understood that various changes and modifications to the presently disclosed embodiments will be apparent to those skilled in the art. Such changes and modifications can be made without departing from the spirit and scope of the present subject matter and without diminishing its intended advantages. It is therefore intended that such changes and modifications be covered by the appended claims.

The invention claimed is:

1. A method of fabricating a wind turbine blade tubular spar, wherein the tubular spar: (i) extends along a designated axis, and (ii) is made of a reinforced polymer material including: (A) a plurality of fibers arranged in at least two directions, and (B) a polymer matrix incorporating the fibers, the method comprising:
   (a) molding a cap and a web;
   (b) cross-linking at least part of at least one of: the molded cap and the molded web in a composite material;
   (c) molding a substantially L-shaped structure which: (i) at least partly incorporates the molded cap and the molded web, and (ii) includes two opposite flanges which are: (A) substantially parallel to each other, (B) substantially parallel to the molded cap, and (C) offset from each other;
   (d) cross-linking the substantially L-shaped structure in the composite material;
   (e) repeating (a) to (d) for another substantially L-shaped structure; and
   (f) joining the two substantially L-shaped structures with the flanges positioned facing in pairs.

2. The method of claim 1, wherein molding the cap and the web includes molding a main body and at least one lateral flange projecting with respect to the main body.

3. The method of claim 1, wherein molding and cross-linking the substantially L-shaped structure includes:
   successively placing inside a mold:
      at least one fiber layer,
      a preformed cross-linked part of the cap, said preformed cross-linked part of the cap positioned on top of the fiber layer,
      a core positioned substantially perpendicular to the preformed cross-linked part of the cap and on top of the fiber layer, and
      at least one further fiber layer positioned on top of the preformed cross-linked part of the cap and the core, and
   incorporating the fiber layers, the preformed cross-linked part of the cap, and the core in a polymer matrix.

4. The method of claim 3, wherein, a plurality of the fibers extend in a direction parallel to the designated axis, a plurality of the fibers extend in a direction perpendicular to the designated axis, a plurality of the fibers form a substantially 45 degree angle with the designated axis, and a plurality of the fibers form a substantially negative 45 degree angle with the designated axis.

5. The method of claim 3, wherein the at least one fiber layer and the at least one further fiber layer are laid one directly on top of the other at the flanges.

6. The method of claim 1, wherein joining the two substantially L-shaped structures includes:
   applying a plurality of layers of glue between the opposite, parallel flanges of the two substantially L-shaped structures, and
   cross-linking the plurality of layers of glue.

7. A method of fabricating a wind turbine blade tubular spar, wherein the tubular spar: (i) extends along a designated axis, and (ii) is made of a reinforced polymer material including: (A) a plurality of fibers arranged in at least two directions, and (B) a polymer matrix incorporating the fibers, the method comprising:
   (a) for a first substantially L-shaped structure:
      (i) molding a first cap and a first web,
      (ii) cross-linking at least part of at least one of: the first molded cap and the first molded web in a composite material,
      (iii) molding the first substantially L-shaped structure which: (A) at least partly incorporates the first molded cap and the first molded web, and (B) includes two opposite flanges which are: (A) substantially parallel to each other, (B) substantially parallel to the first molded cap, and (C) offset from each other, and
      (iv) cross-linking the first substantially L-shaped structure in the composite material;
   (b) for a second substantially L-shaped structure:
      (i) molding a second cap and a second web,
      (ii) cross-linking at least part of at least one of: the second molded cap and the second molded web in the composite material,
      (iii) molding the second substantially L-shaped structure which: (A) at least partly incorporates the second molded cap and the second molded web, and (B) includes two opposite flanges which are: (A) substantially parallel to each other, (B) substantially parallel to the second molded cap, and (C) offset from each other, and
      (iv) cross-linking the second substantially L-shaped structure in the composite material; and
   (c) joining the first and second substantially L-shaped structures such that a first one of the two opposite flanges of the first substantially L-shaped structure is joined to a first one of the two opposite flanges of the second substantially L-shaped structure and a second one of the two opposite flanges of the first substantially L-shaped structure is joined to a second one of the two opposite flanges of the second substantially L-shaped structure.

8. A method of fabricating a wind turbine blade tubular spar, wherein the tubular spar: (i) extends along a designated axis, and (ii) is made of a reinforced polymer material including: (A) a plurality of fibers arranged in at least two directions, and (B) a polymer matrix incorporating the fibers, the method comprising:
   (a) molding a cap and a web;
   (b) cross-linking at least part of at least one of: the molded cap and the molded web in a composite material, wherein at least one of the molded cap, and the molded web are formed by:
      (i) laying at least one fiber layer in a first mold,
      (ii) incorporating the at least one fiber layer in a liquid polymer matrix by:

(A) forming a closed chamber about the at least one fiber layer in the first mold,
(B) forming a vacuum in the closed chamber, and
(C) drawing the liquid polymer matrix by suction into the closed vacuum chamber, and
(iii) cross-linking the polymer matrix;
(c) molding a substantially L-shaped structure which: (i) at least partly incorporates the molded cap and the molded web, and (ii) includes two opposite flanges substantially parallel to each other and substantially parallel to the molded cap;
(d) cross-linking the substantially L-shaped structure in the composite material;
(e) repeating (a) to (d) for another substantially L-shaped structure; and
(f) joining the two substantially L-shaped structures with the flanges positioned facing in pairs.

9. The method of claim 8, wherein molding the cap and the web includes molding a main body and at least one lateral flange projecting with respect to the main body.

10. The method of claim 8, wherein molding and cross-linking the substantially L-shaped structure includes:
successively placing inside a second mold:
at least one fiber layer,
a preformed cross-linked part of the cap, said preformed cross-linked part of the cap positioned on top of the fiber layer,
a core positioned substantially perpendicular to the preformed cross-linked part of the cap and on top of the fiber layer, and
at least one further fiber layer positioned on top of the preformed cross-linked part of the cap and the core, and
incorporating the fiber layers, the preformed cross-linked part of the cap, and the core in a polymer matrix.

11. The method of claim 10, wherein, a plurality of the fibers extend in a direction parallel to the designated axis, a plurality of the fibers extend in a direction perpendicular to the designated axis, a plurality of the fibers form a substantially 45 degree angle with the designated axis, and a plurality of the fibers form a substantially negative 45 degree angle with the designated axis.

12. The method of claim 10, wherein the at least one fiber layer and the at least one further fiber layer are laid one directly on top of the other at the flanges.

13. The method of claim 8, wherein joining the two substantially L-shaped structures includes:
applying a plurality of layers of glue between the opposite, parallel flanges of the two substantially L-shaped structures, and
cross-linking the plurality of layers of glue.

14. A method of fabricating a wind turbine blade tubular spar, wherein the tubular spar: (i) extends along a designated axis, and (ii) is made of a reinforced polymer material including: (A) a plurality of fibers arranged in at least two directions, and (B) a polymer matrix incorporating the fibers, the method comprising:
(a) molding a cap and a web, said cap being molded in a first mold, and said cap including a main body and an anchor including a portion perpendicular to the main body of the cap;
(b) cross-linking at least part of at least one of: the molded cap and the molded web in a composite material, said molded cap being cross-linked in the first mold;
(c) in a second mold, molding a substantially L-shaped structure which: (i) at least partly incorporates the molded cap and the molded web, and (ii) includes two opposite flanges substantially parallel to each other and substantially parallel to the molded cap;
(d) in the second mold, cross-linking the substantially L-shaped structure in the composite material, wherein said molding and cross-linking of the substantially L-shaped structure in the second mold incorporates the anchor in the molded web;
(e) repeating (a) to (d) for another substantially L-shaped structure; and
(f) joining the two substantially L-shaped structures with the flanges positioned facing in pairs.

15. The method of claim 14, wherein molding the cap and the web includes molding a main body and at least one lateral flange projecting with respect to the main body.

16. The method of claim 14, which includes placing the anchor of the cap between at least two fiber layers of the web before incorporating the anchor of the cap in the polymer matrix of the web.

17. The method of claim 14, wherein molding and cross-linking the substantially L-shaped structure includes:
successively placing inside the second mold:
at least one fiber layer,
a preformed cross-linked part of the cap, said preformed cross-linked part of the cap positioned on top of the fiber layer,
a core positioned substantially perpendicular to the preformed cross-linked part of the cap and on top of the fiber layer, and
at least one further fiber layer positioned on top of the preformed cross-linked part of the cap and the core, and
incorporating the fiber layers, the preformed cross-linked part of the cap, and the core in a polymer matrix.

18. The method of claim 17, wherein, a plurality of the fibers extend in a direction parallel to the designated axis, a plurality of the fibers extend in a direction perpendicular to the designated axis, a plurality of the fibers form a substantially 45 degree angle with the designated axis, and a plurality of the fibers form a substantially negative 45 degree angle with the designated axis.

19. The method of claim 17, wherein the at least one fiber layer and the at least one further fiber layer are laid one directly on top of the other at the flanges.

20. The method of claim 14, wherein joining the two substantially L-shaped structures includes:
applying a plurality of layers of glue between the opposite, parallel flanges of the two substantially L-shaped structures, and
cross-linking the plurality of layers of glue.

21. A method of fabricating a wind turbine blade tubular spar, wherein the tubular spar: (i) extends along a designated axis, and (ii) is made of a reinforced polymer material including: (A) a plurality of fibers arranged in at least two directions, and (B) a polymer matrix incorporating the fibers, the method comprising:
(a) molding a cap and a web, said web being molded in a first mold, and said web including a main body and an anchor including a portion perpendicular to the main body of the web;
(b) cross-linking at least part of at least one of: the molded cap and the molded web in a composite material, said molded web being cross-linked in the first mold;
(c) in a second mold, molding a substantially L-shaped structure which: (i) at least partly incorporates the molded cap and the molded web, and (ii) includes two opposite flanges substantially parallel to each other and substantially parallel to the molded cap;

(d) in the second mold, cross-linking the substantially L-shaped structure in the composite material, wherein said molding and cross-linking of the substantially L-shaped structure in the second mold incorporates the anchor in the molded cap;

(e) repeating (a) to (d) for another substantially L-shaped structure; and (f) joining the two substantially L-shaped structures with the flanges positioned facing in pairs.

22. The method of claim 21, wherein molding the cap and the web includes molding a main body and at least one lateral flange projecting with respect to the main body.

23. The method of claim 21, wherein molding the cap includes placing the anchor of the web between at least two fiber layers of the cap.

24. The method of claim 21, wherein molding and cross-linking the substantially L-shaped structure in the second mold includes:

successively placing inside a mold:
- at least one fiber layer,
- a preformed cross-linked part of the cap, said preformed cross-linked part of the cap positioned on top of the fiber layer,
- a core positioned substantially perpendicular to the preformed cross-linked part of the cap and on top of the fiber layer, and
- at least one further fiber layer positioned on top of the preformed cross-linked part of the cap and the core, and incorporating the fiber layers, the preformed cross-linked part of the cap, and the core in a polymer matrix.

25. The method of claim 24, wherein, a plurality of the fibers extend in a direction parallel to the designated axis, a plurality of the fibers extend in a direction perpendicular to the designated axis, a plurality of the fibers form a substantially 45 degree angle with the designated axis, and a plurality of the fibers form a substantially negative 45 degree angle with the designated axis.

26. The method of claim 24, wherein the at least one fiber layer and the at least one further fiber layer are laid one directly on top of the other at the flanges.

27. The method of claim 21, wherein joining the two substantially L-shaped structures includes:

applying a plurality of layers of glue between the opposite, parallel flanges of the two substantially L-shaped structures, and cross-linking the plurality of layers of glue.

* * * * *